United States Patent
Du et al.

(10) Patent No.: US 9,143,653 B2
(45) Date of Patent: Sep. 22, 2015

(54) IMAGE PROCESSING APPARATUS, METHOD, AND COMPUTER PROGRAM PRODUCT IDENTIFYING SHOW-THROUGH POSITION BASED ON BACK SIDE IMAGE AND EXPANDED FRONT SIDE IMAGE

(71) Applicant: PFU LIMITED, Kahoku-shi, Ishikawa (JP)

(72) Inventors: Jiyun Du, Kahoku (JP); Kunihiko Ohmi, Kahoku (JP)

(73) Assignee: PFU LIMITED, Kahoku-shi (JP)

( * ) Notice: Subject to any disclaimer, the term of this patent is extended or adjusted under 35 U.S.C. 154(b) by 0 days.

(21) Appl. No.: 14/273,924

(22) Filed: May 9, 2014

(65) Prior Publication Data

US 2015/0215493 A1 Jul. 30, 2015

(30) Foreign Application Priority Data

Jan. 28, 2014 (JP) .................... 2014-013654

(51) Int. Cl.
*H04N 1/409* (2006.01)
*G06T 5/40* (2006.01)
*H04N 1/38* (2006.01)
*H04N 1/58* (2006.01)

(52) U.S. Cl.
CPC *H04N 1/409* (2013.01); *G06T 5/40* (2013.01); *H04N 1/38* (2013.01); *H04N 1/4095* (2013.01); *H04N 1/58* (2013.01)

(58) Field of Classification Search
None
See application file for complete search history.

(56) References Cited

U.S. PATENT DOCUMENTS

| 7,064,863 B2 * | 6/2006 | Fukuda et al. | 358/3.26 |
| 8,395,832 B2 * | 3/2013 | Iwamoto | 358/1.9 |
| 2001/0050778 A1 * | 12/2001 | Fukuda et al. | 358/1.9 |
| 2009/0161124 A1 * | 6/2009 | Tamura | 358/1.1 |
| 2015/0002887 A1 | 1/2015 | Kato et al. | |

FOREIGN PATENT DOCUMENTS

| JP | 6-14185 | 1/1994 |
| JP | 06-062216 | 3/1994 |
| JP | 2000-22946 | 1/2000 |
| JP | 2009-188892 | 8/2009 |
| JP | 2013-158997 | 8/2013 |

OTHER PUBLICATIONS

Office action mailed Mar. 17, 2015 for corresponding Japanese Patent Application No. 2014-013654 including English translation, 11pp.

* cited by examiner

*Primary Examiner* — Scott A Rogers
(74) *Attorney, Agent, or Firm* — Christie, Parker & Hale, LLP

(57) ABSTRACT

An image processing apparatus includes an input image acquiring module for acquiring a first input image generated by reading one side of a document and a second input image generated by reading the other side of the document, a binarized image generator for generating a first binarized image by binarizing the first input image and a second binarized image by binarizing the second input image, an expanded image generator for generating an expanded image containing an expanded pixel obtained by expanding a valid pixel contained in the first binarized image, and a show-through position identifying module for identifying a show-through position in the second input image, based on the second binarized image and the expanded image.

13 Claims, 21 Drawing Sheets

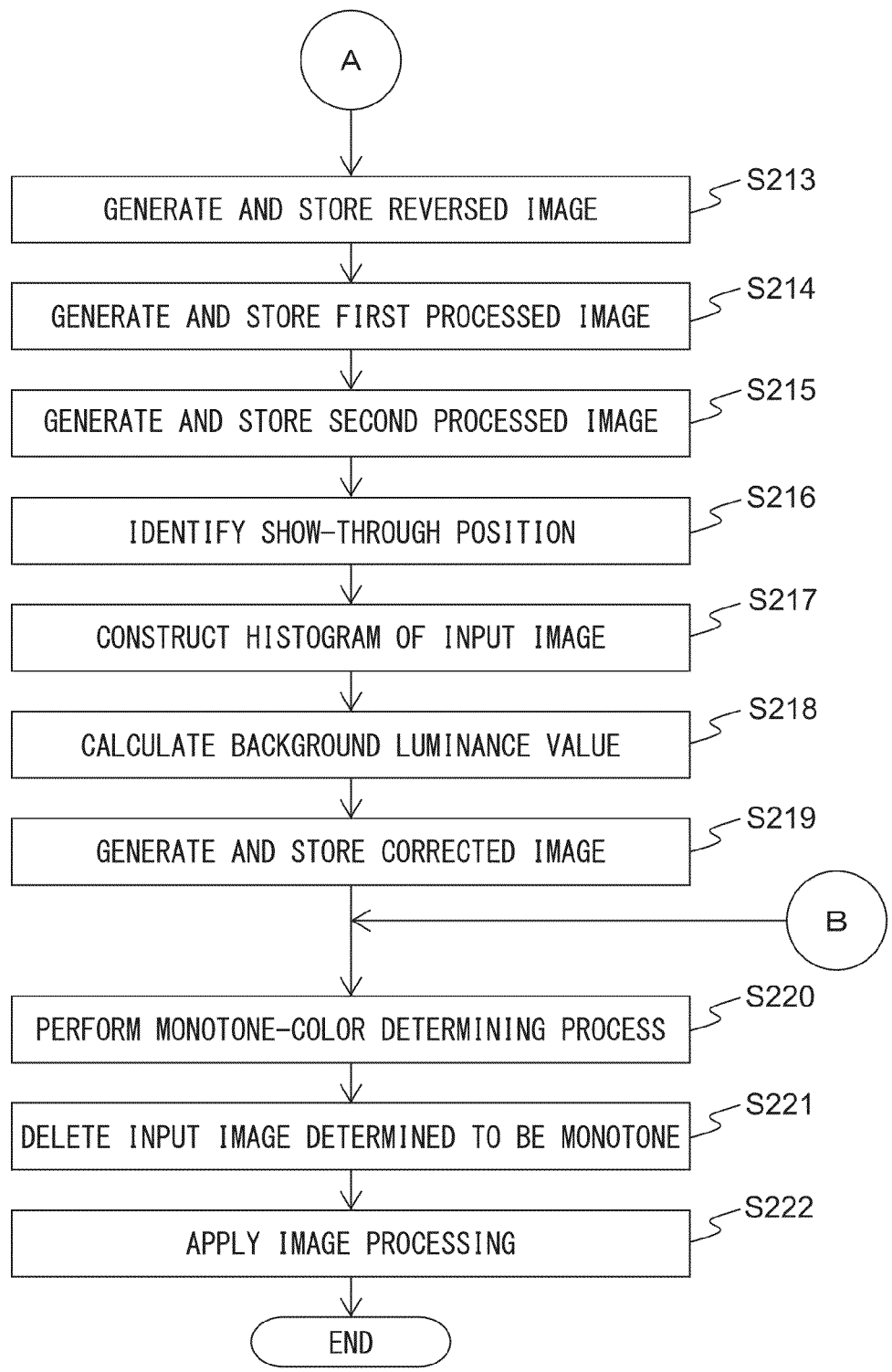

IMAGE PROCESSING APPARATUS, METHOD, AND COMPUTER PROGRAM PRODUCT IDENTIFYING SHOW-THROUGH POSITION BASED ON BACK SIDE IMAGE AND EXPANDED FRONT SIDE IMAGE

CROSS-REFERENCE TO RELATED APPLICATIONS

This application is based upon and claims the benefit of priority of prior Japanese Patent Application No. 2014-013654, filed on Jan. 28, 2014, the entire contents of which are incorporated herein by reference.

TECHNICAL FIELD

Embodiments discussed in the present specification relate to image processing technology.

BACKGROUND

Generally, an image processing system that uses a scanner or like apparatus for reading a document and storing it in the form of image data includes a function to analyze generated data and to automatically erase any image data generated from a blank document. However, if the document is, for example, a sheet of thin paper with content printed only on the front side thereof, a phenomenon known as "show-through" can occur in which the content printed on the front side of the document shows through to the back side, which can lead to the possibility of erroneously determining that the image data generated from the back side is not that of a blank document.

Generally, an image processing system that uses a scanner or like apparatus is also equipped with a function to analyze generated data and to correct any show-through portion of the image data. To correct the show-through portion properly, the position of the show-through portion of the image data must be accurately detected.

An image forming apparatus is disclosed that outputs a front-side image and back-side image of a two-sided document in the form of image data representing image densities. This image forming apparatus converts the pixel data of the back-side image so that the back-side image data generated by reading the side opposite to the front-side image data can be matched with the front-side image data, generates binarized back-side image data by binarizing the converted pixel data, and obtains overlapping image data by ANDing the binarized back-side image data with the front-side image data. Then, the image forming apparatus applies thresholding to the overlapping image data to produce image data from which components due to the show-through of the back-side image have been excluded, and obtains image data corresponding to all the pixels contained in the front-side image by combining the thresholded image data with image data produced by subtracting the overlapping image data from the front-side image data (see Japanese Laid-open Patent Publication No. H06-62216).

SUMMARY

Generally, in image processing apparatus, a positional displacement may occur between image data generated from the front side of a document and image data generated from the back side, due to misalignment between an image sensor for imaging the front side of the document and an image sensor for imaging the back side or manufacturing errors of variations in magnification factor of an optical reading system, etc. In such cases, the image processing apparatus may not be able to accurately determine overlapping portions between the front-side image data and the back-side image data, resulting in an inability to properly detect the position of show-through within the image data.

Accordingly, it is an object of the present invention to provide an image processing apparatus and image processing method that can accurately detect the position of show-through in an input image and a computer-readable, non-transitory medium storing a computer program for causing a computer to implement such an image processing method.

According to an aspect of the apparatus, there is provided an image processing apparatus. The image processing apparatus includes an input image acquiring module for acquiring a first input image generated by reading one side of a document and a second input image generated by reading the other side of the document, a binarized image generator for generating a first binarized image by binarizing the first input image and a second binarized image by binarizing the second input image, an expanded image generator for generating an expanded image containing an expanded pixel obtained by expanding a valid pixel contained in the first binarized image, and a show-through position identifying module for identifying a show-through position in the second input image, based on the second binarized image and the expanded image.

According to an aspect of the method, there is provided an image processing method which includes acquiring a first input image generated by reading one side of a document and a second input image generated by reading the other side of the document, generating a first binarized image by binarizing the first input image and a second binarized image by binarizing the second input image, generating an expanded image containing an expanded pixel obtained by expanding a valid pixel contained in the first binarized image, and identifying, using a computer, a show-through position in the second input image, based on the second binarized image and the expanded image.

According to an aspect of the computer-readable, non-transitory medium storing a computer program, the computer program causes a computer to execute a process, including acquiring a first input image generated by reading one side of a document and a second input image generated by reading the other side of the document, generating a first binarized image by binarizing the first input image and a second binarized image by binarizing the second input image, generating an expanded image containing an expanded pixel obtained by expanding a valid pixel contained in the first binarized image, and identifying a show-through position in the second input image, based on the second binarized image and the expanded image.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

FIG. 7 is a flowchart showing an example of the operation of the show-through position identifying process.

DESCRIPTION OF EMBODIMENTS

Hereinafter, an image processing apparatus, image processing method, and computer program according to an embodiment, will be described with reference to the drawings. However, it should be noted that the technical scope of the invention is not limited to these embodiments, and extends to the inventions described in the claims and their equivalents.

Figure 1:
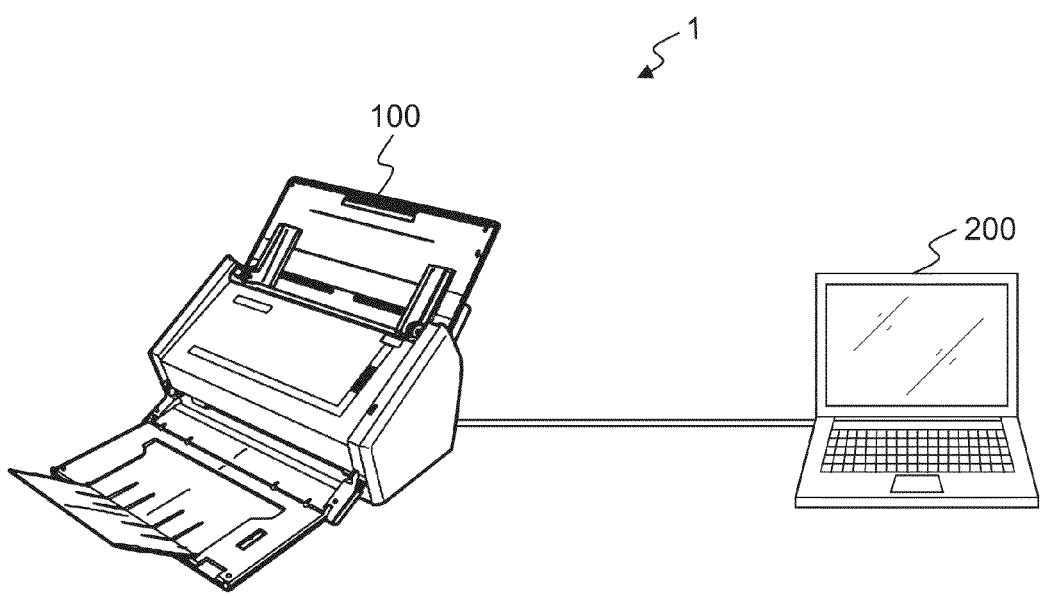
FIG. 1 is a diagram showing an image processing system 1 according to an embodiment.

FIG. 1 is a diagram showing an image processing system 1 according to an embodiment.

As shown in FIG. 1, the image processing system 1 includes an image reading apparatus 100 and an information processing apparatus 200. The image reading apparatus 100 is, for example, an image scanner or the like. The image reading apparatus 100 may be any kind of apparatus as long as it is designed to read both sides of a document, and may be, for example, an image copying apparatus. The information processing apparatus 200 is one example of the image processing apparatus, and is, for example, a personal computer or the like which is connected to the image reading apparatus 100 for use. Alternatively, the information processing apparatus 200 may be a portable information terminal, mobile telephone, or the like which is connected via radio to the image reading apparatus 100.

Figure 2:
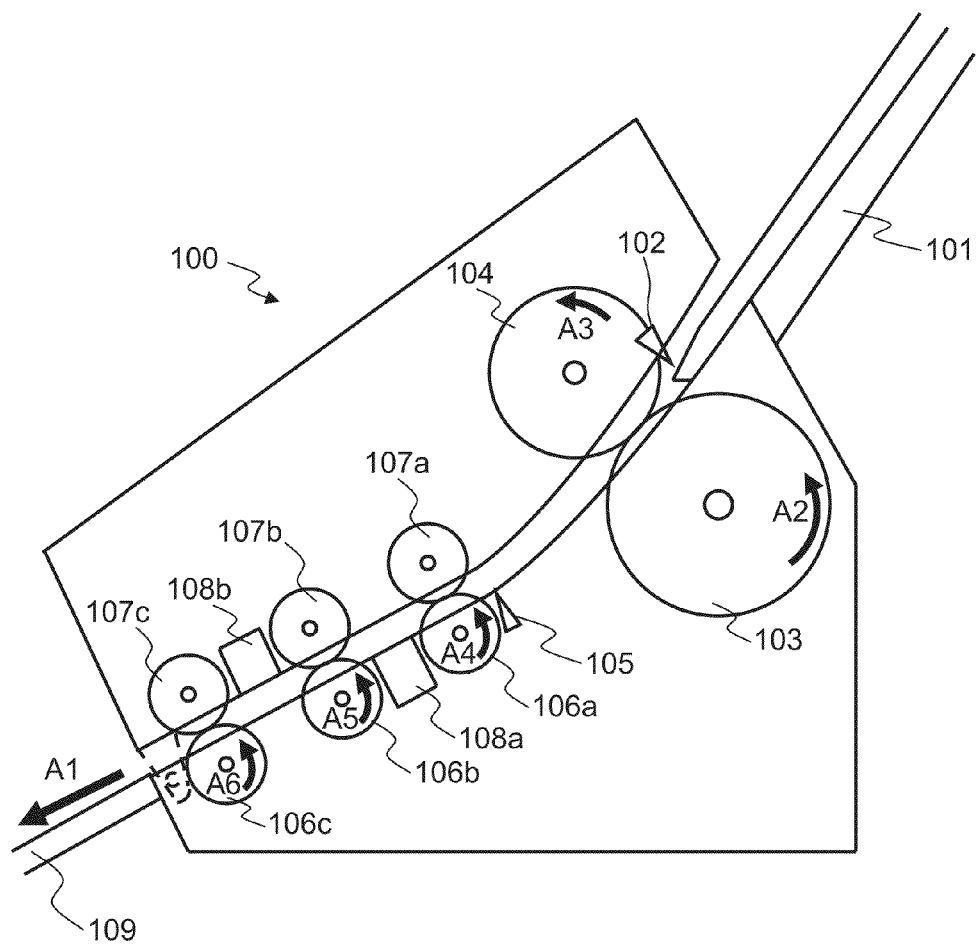
FIG. 2 is a diagram for explaining an example of a transport path inside an image reading apparatus 100.

FIG. 2 is a diagram for explaining an example of a transport path inside the image reading apparatus 100.

The transport path inside the image reading apparatus 100 includes a document tray 101, a first document detector 102, a paper feed roller 103, a retard roller 104, a second document detector 105, first to third transport rollers 106a to 106c, and first to third driven rollers 107a to 107c. The transport path inside the image reading apparatus 100 further includes a first image generator 108a, a second image generator 108b, and an exit tray 109.

In FIG. 2, arrow A1 indicates the document transport direction. In the following description, "upstream" means upstream along the document transport direction A1, and "downstream" means downstream along the document transport direction A1.

The first document detector 102 includes a contact detection sensor disposed on the upstream side of the paper feed roller 103 and the retard roller 104, and detects whether a document is placed on the document tray 101. The first document detector 102 generates and outputs a first document detection signal whose signal value differs depending on whether a document is placed on the document tray 101 or not.

The second document detector 105 includes a contact detection sensor disposed on the upstream side of the first and second image generators 108a and 108b, and detects whether a document has been fed to a prescribed position upstream of the first and second image generators 108a and 108b. The second document detector 105 generates and outputs a second document detection signal whose signal value differs depending on whether a document has been fed to the prescribed position or not.

The first image generator 108a includes an image sensor for capturing an image of the subject such as a document or the like. The image sensor includes CMOS (Complementary Metal Oxide Semiconductor) imaging devices arranged in a one-dimensional or two-dimensional array and an optical system for focusing the image of the subject onto the imaging devices. Each imaging device reads information from the back side of the document and outputs an analog value corresponding to each RGB color. The first image generator 108a generates pixel data by converting each of the analog values output from the image sensor into a digital value, and generates image data (hereinafter called the RGB image) constructed from the pixel data. The RGB image provides color image data represented, for example, by a total of 24 bits of RGB values with each pixel data represented by 8 bits for each RGB color. Then, the first image generator 108a generates an image (hereinafter called the input image) by converting the RGB values of the pixels in the RGB image into a luminance value and color difference values (YUV values) and outputs the generated image. The YUV values can be calculated, for example, from the following equations.

$$Y \text{ value} = 0.30 \times R \text{ value} + 0.59 \times G \text{ value} + 0.11 \times B \text{ value} \quad (1)$$

$$U \text{ value} = -0.17 \times R \text{ value} - 0.33 \times G \text{ value} + 0.50 \times B \text{ value} \quad (2)$$

$$V \text{ value} = 0.50 \times R \text{ value} - 0.42 \times G \text{ value} - 0.08 \times B \text{ value} \quad (3)$$

Likewise, the second image generator 108b includes an image sensor for capturing an image of the subject such as a document or the like. The image sensor includes CMOS imaging devices arranged in a one-dimensional or two-dimensional array and an optical system for focusing the image of the subject onto the imaging devices, and each imaging device reads information from the front side of the document and outputs an analog value corresponding to each RGB color. The second image generator 108b generates pixel data by converting each of the analog values output from the image sensor into a digital value, and generates an RGB image. Then, the second image generator 108b generates an input image by converting the RGB values of the pixels in the RGB image into YUV values, and outputs the generated image.

The image sensor used in each of the first and second image generators 108a and 108b may be constructed from CCD (Charge Coupled Device) imaging devices instead of CMOS imaging devices. In the following description, the first and second image generators 108a and 108b may sometimes be referred to collectively as the image generator 108.

The document placed on the document tray 101 is transported in the document transport direction A1 by the paper feed roller 103 rotating in the direction of arrow A2 in FIG. 2. The retard roller 104 rotates in the direction of arrow A3 in FIG. 2 while the document is being transported. With the paper feed roller 103 and the retard roller 104 thus working together, when multiple documents are placed on the document tray 101 only the document contacting the paper feed roller 103 is separated from the other documents and allowed to pass through.

The document is then fed into the path between the first transport roller 106a and the first driven roller 107a, and is advanced to the document reading position on the first image generator 108a as the first transport roller 106a rotates in the direction of arrow A4 in FIG. 2. The document whose back side has been read by the first image generator 108a is advanced to the document reading position on the second image generator 108b as the second transport roller 106b rotates in the direction of arrow A5 in FIG. 2. The document whose front side has been read by the second image generator 108b is fed onto the exit tray 109 as the third transport roller 106c rotates in the direction of arrow A6 in FIG. 2.

Figure 3:
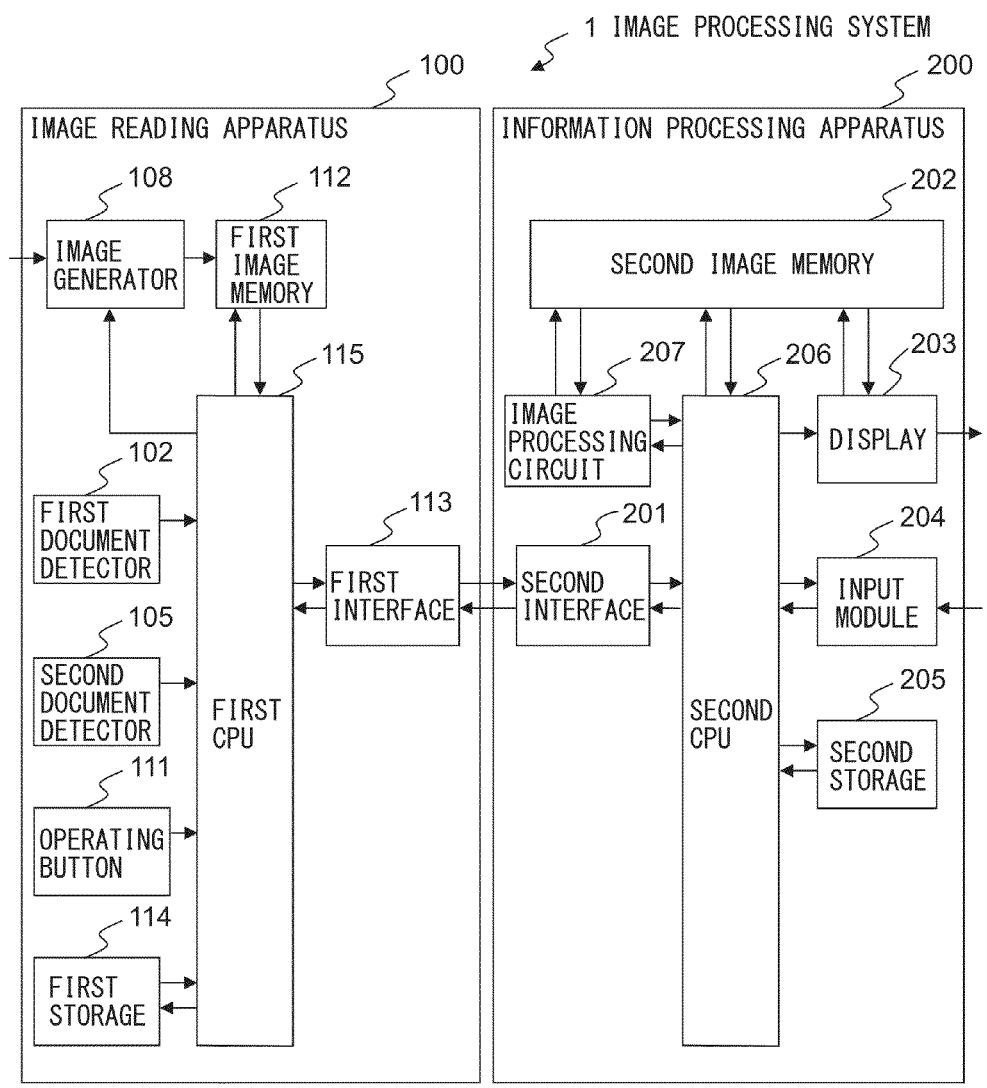
FIG. 3 is a diagram showing schematically the configuration of the image processing system 1.

FIG. 3 is a diagram showing schematically the configuration of the image processing system 1.

The image reading apparatus 100 includes, in addition to the earlier described component elements, an operating button 111, a first image memory 112, a first interface 113, a first storage 114, and a first CPU (Central Processing Unit) 115. These component elements constituting the image reading apparatus 100 will be described in detail below.

The operating button 111 is located on the front side of the image reading apparatus 100 and, when depressed, generates an operation detection signal which is sent to the first CPU 115.

The first memory 112 includes a storage device such as a nonvolatile semiconductor memory, a volatile semiconductor memory, or a magnetic disk or the like. The first memory 112 is connected to the image generator 108 and stores the input image generated by the image generator 108.

The first interface 113 includes an interface circuit conforming to a serial bus architecture such as USB (Universal Serial Bus), and is electrically connected to the information processing apparatus 200 for transmission and reception of various kinds of information as well as image data. Further, a flash memory or the like may be connected to the first interface 113 so that the image data stored in the first image memory 112 may be temporarily stored in the flash memory and transferred to the information processing apparatus 200.

The first storage 114 includes a memory device such as a RAM (Random Access Memory) or ROM (Read Only Memory), a fixed disk device such as a hard disk, or a removable storage device such as a flexible disk or an optical disk. The first storage 114 stores a computer program, data base, table, etc., which are used by the image reading apparatus 100 to perform various processing operations. The computer program may be installed from a computer-readable removable recording medium. The computer program may be installed on the first storage 114 from a computer-readable, non-transitory medium such as a compact disk read only memory (CD-ROM), a digital versatile disk read only memory (DVD-ROM), or the like by using a well-known setup program or the like. The first storage 114 further stores information concerning the resolution for document reading. The resolution information is set up from the information processing apparatus 200 via the first interface 113.

The first CPU 115 is connected to the first document detector 102, the second document detector 105, the image generator 108, the first image memory 112, the first interface 113, and the first storage 114, and controls them. The first CPU 115 performs control operations such as the control of the input image generation by the image generator 108, the control of the first image memory 112, the control of data transmission and reception via the first interface 113, and the control of the first storage 114.

The information processing apparatus 200 includes a second interface 201, a second image memory 202, a display 203, an input module 204, a second storage 205, a second CPU 206, and an image processing circuit 207. The component elements of the information processing apparatus 200 will be described in detail below.

The second interface 201 includes an interface circuit similar to the one constituting the first interface 113 in the image reading apparatus 100, and connects the information processing apparatus 200 to the image reading apparatus 100.

The second image memory 202 includes a storage device similar to the one constituting the first image memory 112 in the image reading apparatus 100. The second image memory 202 stores readout images received from the image reading apparatus 100 via the second interface 201, and also stores various kinds of processed images that the image processing circuit 207 generated by performing image processing operations on the readout images.

The display 203 includes a display, such as a liquid crystal display or an organic EL (electroluminescent) display, and an interface circuit which outputs image data to the display. The display 203 is connected to the second image memory 202 and displays the image data retrieved from the second image memory 202.

The input module 204 includes an input device such as a keyboard, mouse, etc., and an interface circuit which acquires signals from the input device, and sends a signal to the second CPU 206 in response to the user operation.

The second storage 205, similarly to the first storage 114 in the image reading apparatus 100, includes a memory device, a fixed disk device, a removable storage device, or the like. The second storage 205 stores a computer program, data base, table, etc., which are used in the information processing apparatus 200 for various kinds of processing. The computer program may be installed on the second storage 205 from a computer-readable, non-transitory medium such as a compact disk read only memory (CD-ROM), a digital versatile disk read only memory (DVD-ROM), or the like by using a well-known setup program or the like. The second storage 205 further stores information concerning the resolution for document reading. The resolution information is set up by the user using the input module 204, and is set in the image reading apparatus 100 via the second interface 201.

The second CPU 206 is connected to the second interface 201, the second image memory 202, the display 203, the input module 204, the second storage 205, and the image processing circuit 207, and controls them. The second CPU 206 performs control operations such as the control of data transmission and reception via the second interface 201, the control of the second image memory 202, the display control for the display 203, the input control of the input module 204, the control of the second storage 205, and the control of the image processing operations performed by the image processing circuit 207.

The image processing circuit 207 is connected to the second image memory 202, and performs processing for identifying the position of show-through. The image processing circuit 207 is connected to the second CPU 206, and performs operations under the control of the second CPU 206 in accordance with the program prestored in the second storage 205. The image processing circuit 207 may be constructed from an independent integrated circuit, microprocessor, firmware, or the like. Alternatively, the image processing circuit 207 may be incorporated in the second CPU 206.

Figure 4:
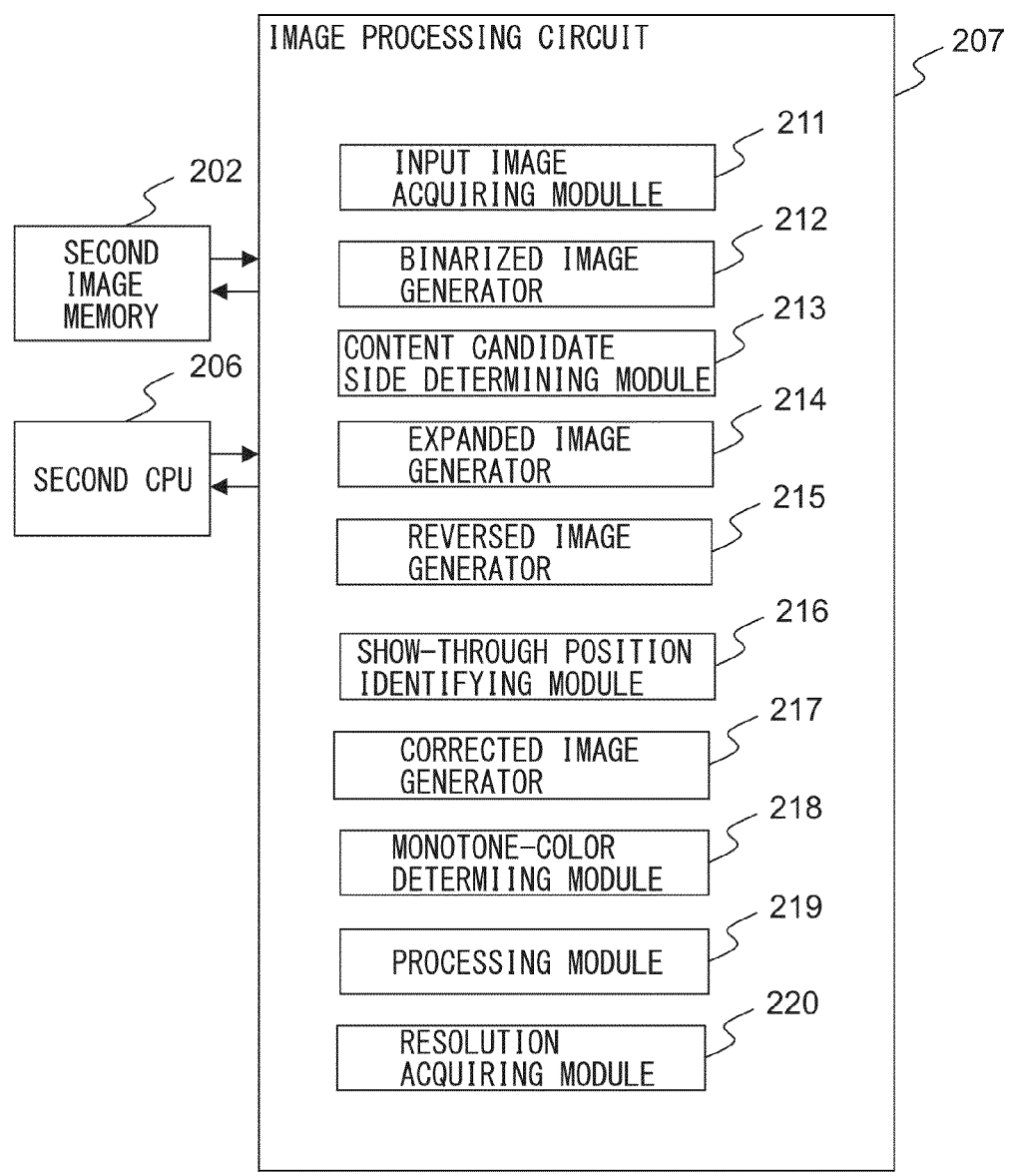
FIG. 4 is a diagram showing schematically the configuration of an image processing circuit 207.

FIG. 4 is a diagram showing schematically the configuration of the image processing circuit 207. As shown in FIG. 4, the image processing circuit 207 includes an input image acquiring module 211, a binarized image generator 212, a content candidate side determining module 213, an expanded image generator 214, a reversed image generator 215, a show-through position identifying module 216, a corrected image generator 217, and a monotone-color determining module 218. The image processing circuit 207 further includes a processing module 219 and a resolution acquiring module 220. Each of these units is a functional module implemented by software operating on a processor. Alternatively, each of these units may be constructed from an independent integrated circuit, microprocessor, firmware or the like.

Figure 5:
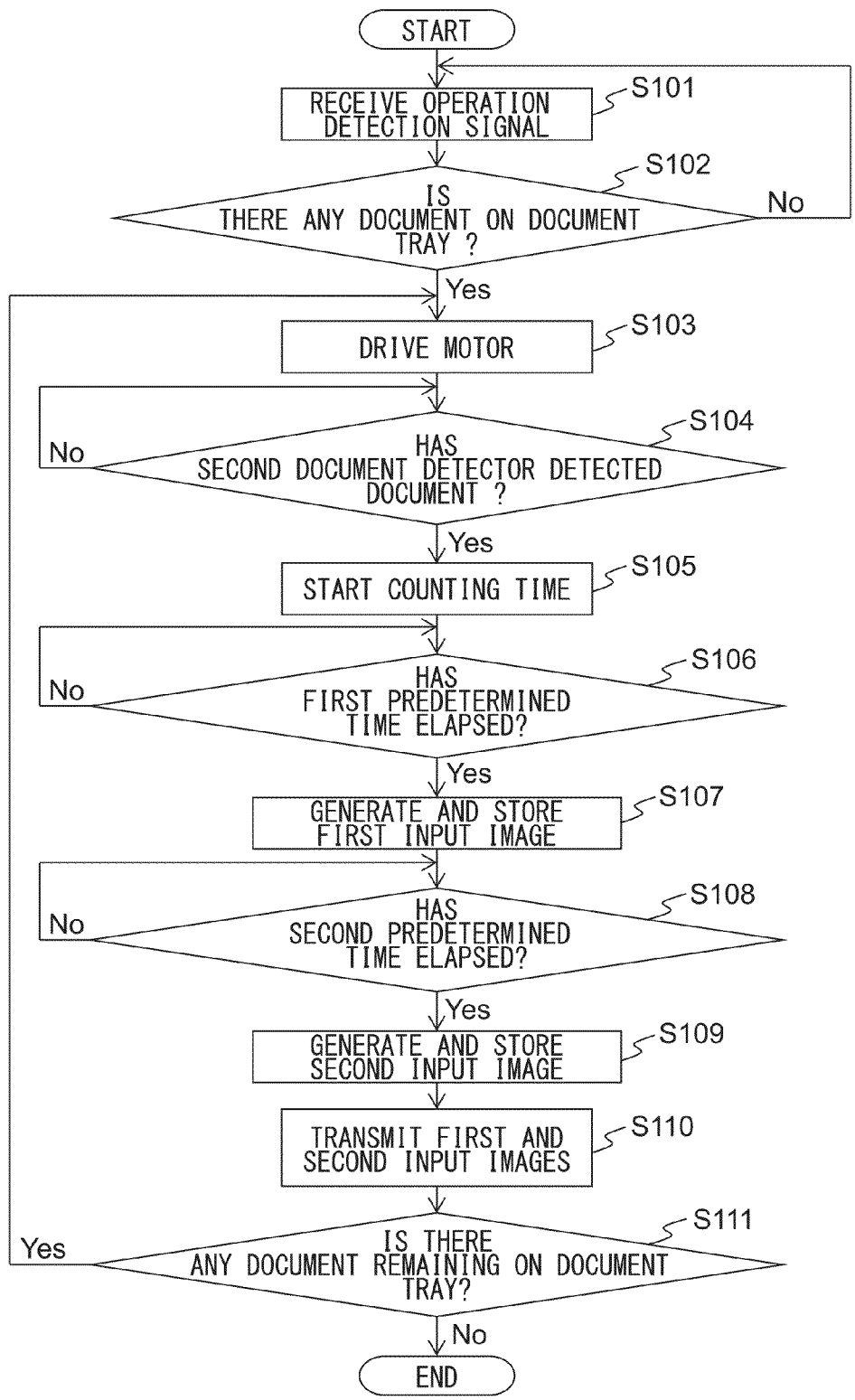
FIG. 5 is a flowchart showing an example of the operation of an image reading process.

FIG. 5 is a flowchart showing an example of the operation of the image reading process performed by the image reading apparatus 100. The operation of the image reading process will be described below with reference to the flowchart of FIG. 5. The operation flow described hereinafter is executed primarily by the first CPU 115 in collaboration with the various component elements of the image reading apparatus 100 in accordance with the program prestored in the first storage 114. The flowchart is executed at predetermined intervals of time.

The first CPU 115 waits until it receives an operation detection signal which the operating button 111 generates when depressed by the user (step S101).

Next, based on a first position detection signal received from the first document detector 102, the first CPU 115 determines whether or not a document is placed on the document tray 101 (step S102).

If there is no document on the document tray 101, the first CPU 115 returns the process to step S101 and waits until it receives a new operation detection signal from the operating button 111.

On the other hand, if a document is placed on the document tray 101, the first CPU 115 drives a motor not shown and thereby rotates the paper feed roller 103, the retard roller 104, and the first to third transport rollers 106a to 106c to transport the document (step S103).

Then, the first CPU 115 waits until the leading edge of the document is detected by the second document detector 105 (step S104). When the value of the second document detection signal from the second document detector 105 has changed from a value indicating the absence of a document to a value indicating the presence of a document, the first CPU 115 determines that the leading edge of the document is detected as having reached the position of the second document detector 105.

When the leading edge of the document is detected by the second document detector 105, the first CPU 115 starts to count the time (step S105).

The first image generator 108a waits until a first predetermined time elapses after the first CPU 115 has started to count the time (step S106). The first predetermined time is set, based on the transport speed, equal to the time that elapses from the moment the leading edge of the document passes the position of the second document detector 105 until it reaches the position of the first image generator 108a.

When the first predetermined time has elapsed, the first image generator 108a generates the second input image by reading the back side of the document and stores the image in the first image memory 112 (step S107).

Next, the second image generator 108b waits until a second predetermined time elapses after the first CPU 115 has started to count the time (step S107). The second predetermined time is set, based on the transport speed, equal to the time that elapses from the moment the leading edge of the document passes the position of the second document detector 105 until it reaches the position of the second image generator 108b.

When the second predetermined time has elapsed, the second image generator 108b generates the first input image by reading the front side of the document and stores the image in the first image memory 112 (step S109).

The first CPU 115 transmits the first and second input images stored in the first image memory 112 to the information processing apparatus 200 via the first interface 113 (step S110).

Next, based on the first position detection signal received from the first document detector 102, the first CPU 115 determines whether there is any document remaining on the document tray 101 (step S111).

If there is a document remaining on the document tray 101, the first CPU 115 returns the process to step S103 and repeats the process of steps S103 to S110. On the other hand, if there is no longer a document remaining on the document tray 101, the first CPU 115 terminates the series of steps.

Figure 6:
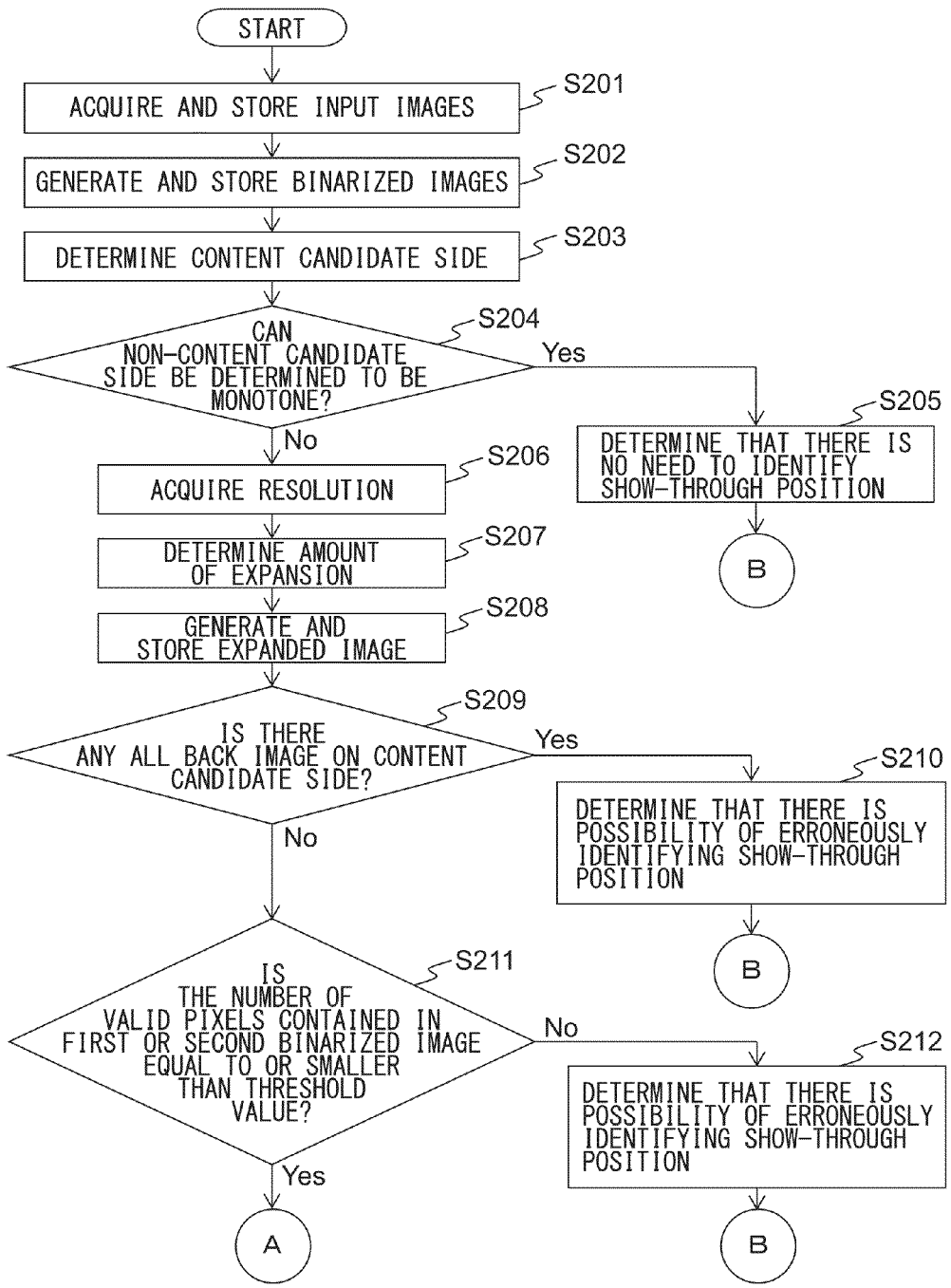
FIG. 6 is a flowchart showing an example of the operation of a show-through position identifying process.

FIGS. 6 and 7 are a flowchart illustrating an example of the operation of the show-through position identifying process performed by the information processing apparatus 200. The operation of the show-through position identifying process will be described below with reference to the flowchart of FIGS. 6 and 7. The operation flow described hereinafter is executed primarily by the second CPU 206 in collaboration with the various component elements of the information processing apparatus 200 in accordance with the program prestored in the second storage 205.

First, the input image acquiring module 211 acquires the first and second input images from the image reading apparatus 100 via the second interface 201, and stores the images in the second image memory 202 (step S201).

Figure 8A:
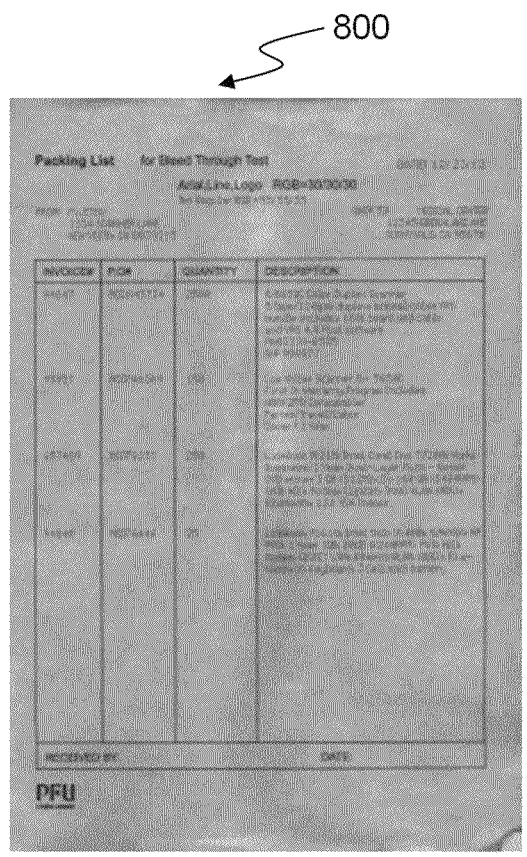
FIG. 8A is a schematic diagram showing an example of a first input image.
Figure 8B:
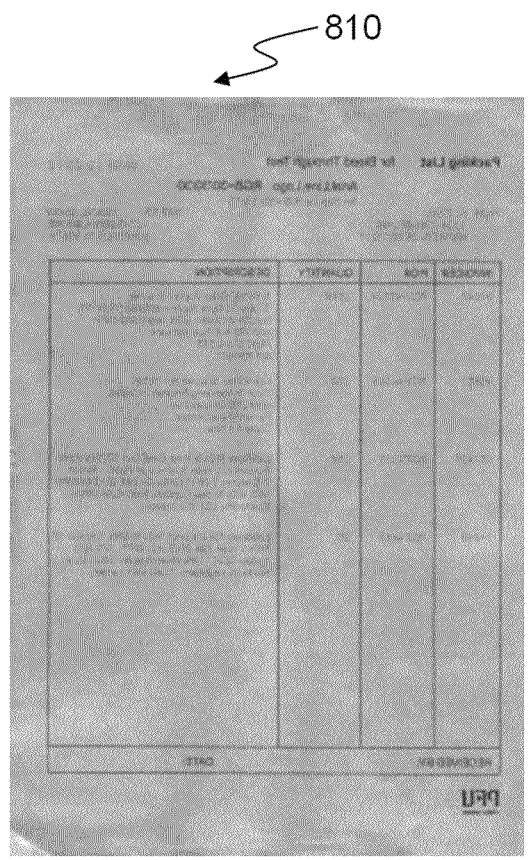
FIG. 8B is a schematic diagram showing an example of a second input image.

FIG. 8A is a schematic diagram showing an example of the first input image, and FIG. 8B is a schematic diagram showing an example of the second input image. The first input image 800 shown in FIG. 8A is generated by reading the front side of a thin paper document that carries content such as characters and a table only on its front side, and the second input image 810 shown in FIG. 8B is generated by reading the back side of the same document. As shown in FIG. 8B, the content carried on the front side of the document shows through to the second input image 810 when actually no content is carried on the back side of the document.

Next, the binarized image generator 212 generates a first binarized image by binarizing the first input image and a second binarized image by binarizing the second input image (step S202). The binarized image generator 212 generates the first binarized image by binarizing, using a binarizing threshold value, the luminance values of the pixels in the first input image and by converting any pixel whose luminance value is lower than the binarizing threshold value into a valid pixel (black pixel) and any pixel whose luminance value is not lower than the binarizing threshold value into an invalid pixel (white pixel). Likewise, the binarized image generator 212 generates the second binarized image by binarizing, using a binarizing threshold value, the luminance values of the pixels in the second input image and by converting any pixel whose luminance value is lower than the binarizing threshold value into a valid pixel and any pixel whose luminance value is not lower than the binarizing threshold value into an invalid pixel. The binarizing threshold value may be set to a predetermined value (for example, 128) or may be set equal to the average value, etc., of the luminance values of the pixels contained in each input image.

Figure 9A:
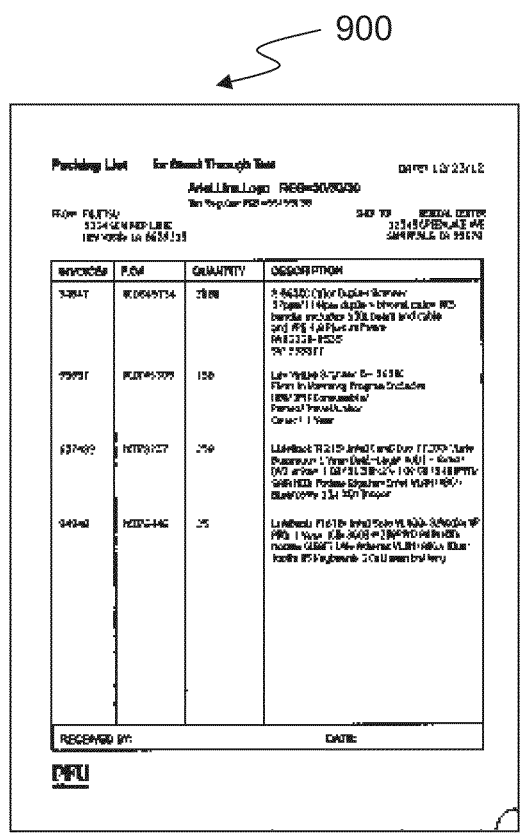
FIG. 9A is a schematic diagram showing an example of a first binarized image.
Figures 9B, 10A:
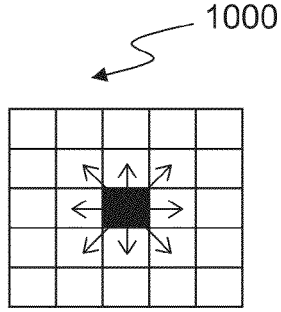
FIG. 9B is a schematic diagram showing an example of a second binarized image.
FIG. 10A is a schematic diagram for explaining an expanded image.

FIG. 9A is a schematic diagram showing an example of the first binarized image, and FIG. 9B is a schematic diagram showing an example of the second binarized input image. The first binarized image 900 shown in FIG. 9A is generated from the first input image 800 shown in FIG. 8A, and the second binarized image 910 shown in FIG. 9B is generated from the second input image 810 shown in FIG. 8B. As shown in FIG. 9B, the second binarized image 910 contains valid pixels generated due to the show-through of the document. However, since the luminance values of the pixels representing the content in the second input image 810 tend to be higher (closer to white) than the luminance values of the pixels representing the content in the first input image 800, the number of valid pixels in the second binarized image 910 is smaller than the number of valid pixels in the first binarized image 900.

Next, the content candidate side determining module 213 determines the content candidate side by selecting between the front side and the back side of the document the side that has the higher probability of carrying the content (step S203). The content candidate side determining module 213 takes the side of the document that carries the first binarized image or the second binarized image, whichever has the larger number of valid pixels, as the content candidate side. Alternatively, the content candidate side determining module 213 may take the side of the document that carries the first binarized image or the second binarized image, whichever has the larger ratio of the number of valid pixels to the total number of pixels, as the content candidate side.

In the example shown in FIGS. 9A and 9B, the front side of the document that carries the first binarized image 900 whose number of valid pixels is larger than the second binarized image 910 is the content candidate side, and the back side of the document is the non-content candidate side which is the side opposite to the content candidate side.

To simplify the explanation, the following description is given by assuming that the front side of the document is the content candidate side, and that the first input image and the first binarized image are generated from the content candidate side while the second input image and the second binarized image are generated from the non-content candidate side. Conversely, if the back side of the document is the content candidate side, the processing performed on the first input image in the following description is performed on the second input image, and the processing performed on the second input image is performed on the first input image. Likewise, the processing performed on the first binarized image in the following description is performed on the second binarized image, and the processing performed on the second binarized image is performed on the first binarized image.

Next, the monotone-color determining module 218 determines whether the non-content candidate side of the document can be determined to be monotone in color (step S204). The term monotone here means that the document carries no content and is represented by a specific single solid color. A monotone document is, for example, a sheet of all-white paper, a sheet of all-black paper, or a sheet of paper of any other single solid color. When the number of valid pixels in the second binarized image generated from the non-content candidate side is smaller than a first threshold value (for example, 10), the monotone-color determining module 218 determines that the non-content candidate side can be determined to be monotone in color (white paper or light-colored paper). On the other hand, when the number of valid pixels in the second binarized image is not smaller than the first threshold value, the monotone-color determining module 218 determines that the non-content candidate side cannot be determined to be monotone in color (white paper or light-colored paper). Alternatively, when the ratio of the number of valid pixels to the total number of pixels in the second binarized image is lower than a second threshold value (for example, 1%), the monotone-color determining module 218 may determine that the non-content candidate side can be determined to be monotone in color (white paper or light-colored paper). In this case, if the ratio of the number of valid pixels to the total number of pixels in the second binarized image is not lower than the second threshold value, the monotone-color determining module 218 determines that the non-content candidate side cannot be determined to be monotone in color (white paper or light-colored paper).

Further, when the number of invalid pixels in the second binarized image is smaller than the first threshold value, or when the ratio of the number of invalid pixels to the total number of pixels in the second binarized image is lower than the second threshold value, the monotone-color determining module 218 may determine that the non-content candidate side can be determined to be monotone in color (black paper or light-colored paper). In this case, if the number of invalid pixels in the second binarized image is not smaller than the first threshold value, or if the ratio of the number of invalid pixels to the total number of pixels in the second binarized image is not lower than the second threshold value, the monotone-color determining module 218 determines that the non-content candidate side cannot be determined to be monotone in color (black paper or light-colored paper).

When the non-content candidate side can be determined to be monotone in color, the monotone-color determining module 218 determines that there is no need to identify the position of show-through because there is hardly any show-through of the document (step S205), and proceeds to step S220. In this case, the expanded image generator 214 does not perform the expanded image generation process to be described later, nor does the show-through position identifying module 216 perform the show-through position identifying process to be described later. Accordingly, the information processing apparatus 200 can speed up processing by reducing the processing load when there is hardly any show-through of the document.

On the other hand, when the non-content candidate side cannot be determined to be monotone in color, the resolution acquiring module 220 retrieves the resolution information from the second storage 205 to acquire the resolution for reading the document (step S206).

Next, the expanded image generator 214 determines the amount (hereinafter called the amount of expansion) by which valid pixels are to be expanded when generating an expanded image containing expanded pixels obtained by expanding the valid pixels contained in the first binarized image generated from the content candidate side (step S207). The expanded image generator 214 varies the amount of expansion as a function of the resolution in such a manner that the amount of expansion increases as the resolution increases, and decreases as the resolution decreases.

Then, the expanded image generator 214 generates the expanded image from the first binarized image generated from the content candidate side (step S208).

Figure 10B:
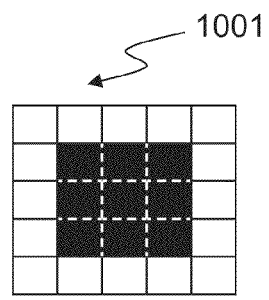
FIG. 10B is a schematic diagram for explaining the expanded image.

FIGS. 10A and 10B are diagrams for explaining the expanded image. The squares shown in the image 1000 of FIG. 10A each indicate a pixel contained in the first binarized image; of these squares, the black square represents a valid pixel, and the white squares each indicate an invalid pixel. The expanded image generator 214 generates the expanded image by expanding the valid pixel in the first binarized image in the directions indicated by arrows in FIG. 10A (i.e. in the horizontal, vertical, and diagonal directions). The squares shown in the image 1100 of FIG. 11B each indicate a pixel contained in the expanded image generated from the image 1000 of FIG. 10A; of these squares, each black square represents an expanded pixel, and each white square indicates a non-expanded pixel which is not an expanded pixel. As shown in FIG. 11B, the valid pixel in the first binarized image and the pixels neighboring it in the horizontal, vertical, and diagonal directions (8 neighbors) are the expanded pixels. FIG. 10B shows an example when the amount of expansion is a single-step expansion. When the amount of expansion is a two-step expansion, all the (25) pixels in the image 1100 of FIG. 10B become expanded pixels.

The expanded image generator 214 may expand the valid pixel in the first binarized image only in the horizontal and vertical directions rather than expanding it in all directions including the diagonal directions. Alternatively, the expanded image generator 214 may expand the valid pixel in the first binarized image only in one direction, i.e., either the document transport direction or the direction orthogonal to the document transport direction.

As will be described later, it is desirable that the amount of expansion be set to a value proportional to the amount of positional displacement that can occur between the first input image and the second input image. Therefore, the expanded image generator 214 may set the amount of expansion differently in the document transport direction than in the direction orthogonal to the document transport direction. Further, rather than varying the amount of expansion as a function of the resolution, the amount of expansion may be fixed, irrespective of the resolution.

Figure 11:
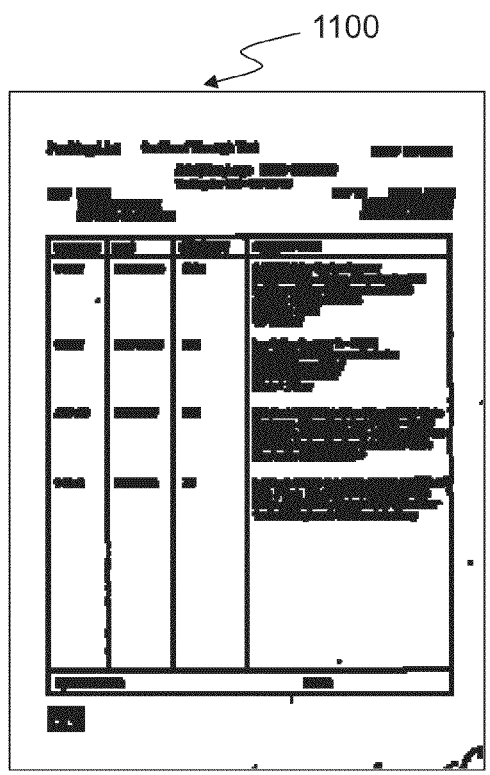
FIG. 11 is a schematic diagram showing an example of the expanded diagram.

FIG. 11 is a schematic diagram showing an example of the expanded diagram. The expanded image 1100 shown in FIG. 11 is generated from the first binarized image 900 shown in FIG. 9A. As shown in FIG. 11, the expanded pixels in the expanded image 1100 are spread more widely than the corresponding valid pixels contained in the first binarized image 900 shown in FIG. 9A.

Next, the monotone-color determining module 218 checks to see whether there is an all-black image represented only by black on the content candidate side of the document (step S209).

Figure 12A:
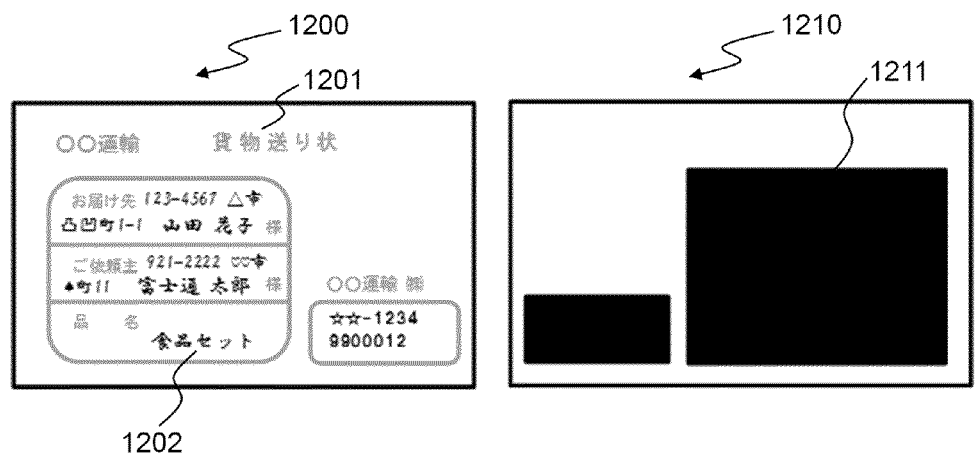
FIG. 12A is a schematic diagrams for explaining why it is necessary to determine the presence or absence of an all-black image.
Figure 12B:
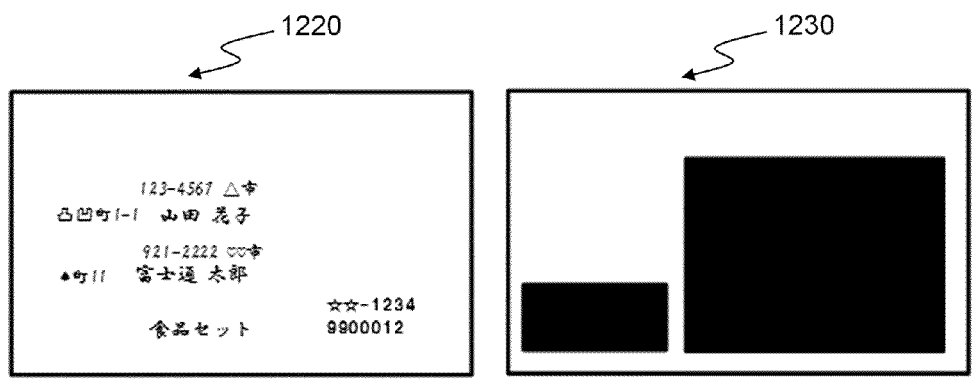
FIG. 12B is a schematic diagrams for explaining why it is necessary to determine the presence or absence of an all-black image.

FIGS. 12A and 12B are schematic diagrams for explaining why it is necessary to determine the presence or absence of an all-black image on the content candidate side of the document. The image 1200 shown in FIG. 12A represents the first input image generated by reading the front side of a conventional shipping invoice, and the image 1210 represents the second input image generated by reading the back side. On the other hand, the image 1220 shown in FIG. 12B represents the first binarized image generated from the first input image 1200, and the image 1230 represents the second binarized image generated from the second input image 1210.

As shown in FIG. 12A, preprinted content 1201 and user-written content 1202 are carried on the front side of the shipping invoice. The content 1201 is printed in a specific light color so that it can be removed by thresholding or color dropout processing to enable the content 1202 to be correctly read by such means as an OCR (Optical Character Reader). Accordingly, in the first binarized image 1220, the pixels associated with the preprinted content 1201 are converted into invalid pixels, while retaining only the pixels associated with the user-written content 1202 as valid pixels, as shown in FIG. 12B.

On the other hand, as shown in FIG. 12A, carbon ink is applied to the areas on the back side of the document that correspond to the areas where the user writes the content on the front side, and these carbon ink areas are represented by black in the second input image 1210. As a result, as shown in FIG. 12B, the number of valid pixels contained in the second binarized image 1230 generated from the back side is larger than the number of valid pixels contained in the binarized image 1220 generated from the front side. This can lead to the possibility that the content candidate side determining module 213 may determine that the back side of the document where no content is carried is the content candidate side and the show-through position identifying module 216 may erroneously identify the position of show-through in the process to be described later. That is, there is the possibility that the pixels associated with the user-written content 1202 may be removed by being erroneously determined to be the pixels associated with the show-through and the front side may be determined to be monotone in color.

In view of the above, the monotone-color determining module 218 checks to see whether there is any all-black image on the content candidate side of the document. If the ratio of the number of expanded pixels in the expanded image to the number of valid pixels in the first binarized image generated from the content candidate side is lower than a third threshold value (for example, 300%), the monotone-color determining module 218 determines that there is an all-black image on the content candidate side. On the other hand, if the ratio of the number of expanded pixels in the expanded image to the number of valid pixels in the first binarized image is not lower than the third threshold value, the monotone-color determining module 218 determines that there is no all-black image on the content candidate side. In the following description, the ratio of the number of expanded pixels in the expanded image to the number of valid pixels in the binarized image will be referred to as the expansion ratio.

Figure 13A:
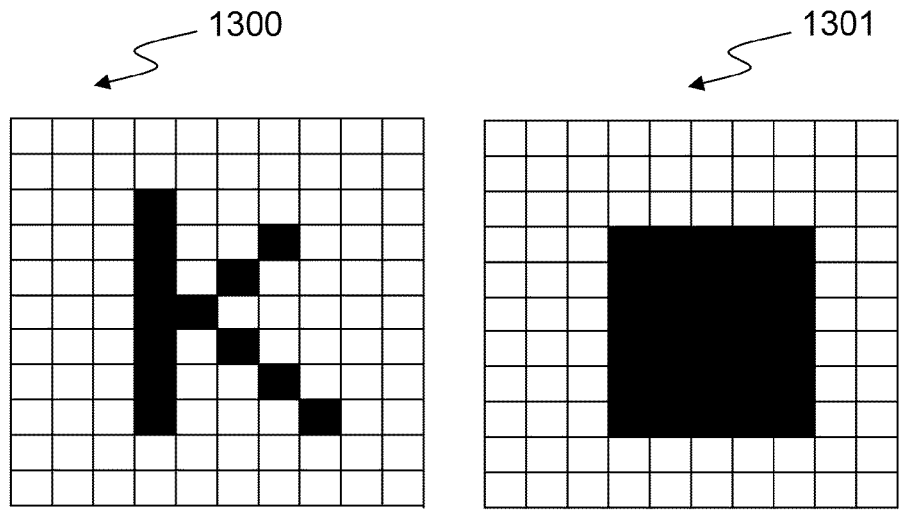
FIG. 13A is a schematic diagrams for explaining an expansion ratio.
Figure 13B:
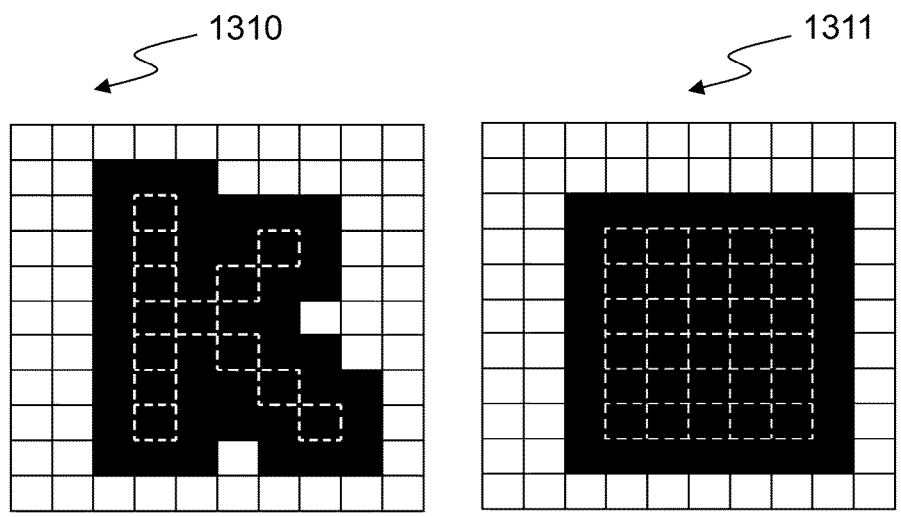
FIG. 13B is a schematic diagrams for explaining the expansion ratio.

FIGS. 13A and 13B are schematic diagrams for explaining the expansion ratio. In FIG. 13A, an image 1300 represents the first binarized image generated from a document that carries a character "K", and an image 1301 represents the first binarized image generated from a document on which carbon ink or the like is applied in a rectangular shape. On the other hand, in FIG. 13B, an image 1310 represents the expanded image generated from the first binarized image 1300, and an image 1311 represents the expanded image generated from the first input image 1301.

The number of valid pixels in the first binarized image 1300 is 13, and the number of expanded pixels in the expanded image 1310 is 52, so that the expansion ratio is 400%. On the other hand, the number of valid pixels in the first binarized image 1301 is 30, and the number of expanded pixels in the expanded image 1311 is 56, so that the expansion ratio is 187%. In this way, when the valid pixels in the binarized image form a rectangular, circular, or like shape, the expansion ratio is relatively low because only its peripheral portion is expanded. On the other hand, in the case of the valid pixels associated with character, graphic, or like content, the expansion ratio is relatively high because the valid pixels tend to be spread in a suitably dispersed manner. By taking advantage of this and by checking whether the expansion ratio is lower than the third threshold value or not, it can be determined whether there is any all-black image on the content candidate side of the document.

If there is an all-black image on the content candidate side of the document, the monotone-color determining module 218 determines that there is the possibility of erroneously identifying the position of the show-through of the document (step S210), and proceeds to step S220. In this case, the show-through position identifying module 216 does not perform the show-through position identifying process to be described later. The information processing apparatus 200 can thus reduce the processing load, while preventing the possibility of erroneously identifying the position of the show-through of the document.

On the other hand, if there is no all-black image on the content candidate side, the monotone-color determining module 218 checks to see whether a photograph, graphic design, or the like is printed over the entire area of one or the other side of the document (step S211). If at least either the number of valid pixels in the first binarized image or the number of valid pixels in the second binarized image is larger than a fourth threshold value (for example, the number corresponding to 50% of the total number of pixels), the monotone-color determining module 218 determines that a photograph, graphic design, or the like is printed on the document. On the other hand, if the number of valid pixels in the first binarized image and the number of valid pixels in the second binarized image are both smaller than the fourth threshold value, the monotone-color determining module 218 determines that a photograph, graphic design, or the like is not printed on the document.

Alternatively, if at least either the ratio of the number of valid pixels to the total number of pixels in the first binarized image or the ratio of the number of valid pixels to the total number of pixels in the second binarized image is higher than a fifth threshold value (for example, 50%), the monotone-color determining module 218 may determine that a photograph or the like is printed on the document. In this case, if the ratio of the number of valid pixels to the total number of pixels in the first binarized image and the ratio of the number of valid pixels to the total number of pixels in the second binarized image are both lower than the fifth threshold value, the monotone-color determining module 218 determines that a photograph or the like is not printed on the document.

If a photograph or the like is printed on the document, then even if characters, etc., are carried on the opposite side thereof, the number of valid pixels in the binarized image generated from the side printed with a photograph or the like tends to become larger than the number of valid pixels in the binarized image generated from the side carrying the characters, etc. This can lead to the possibility that the content candidate side determining module 213 may determine that the side printed with a photograph or the like, not the side carrying the characters, etc., is the content candidate side and the show-through position identifying module 216 may erroneously identify the position of show-through in the process to be described later. In other words, there is the possibility that the pixels associated with the user-written content 1202 may be removed by being erroneously determined to be the pixels associated with the show-through and the front side may be determined to be monotone in color.

If a photograph, graphic design, or the like is printed on one or the other side of the document, the monotone-color determining module 218 determines that there is the possibility of erroneously identifying the position of the show-through of the document (step S212), and proceeds to step S220. In this case, the show-through position identifying module 216 does not perform the show-through position identifying process to be described later. The information processing apparatus 200 can thus reduce the processing load, while preventing the possibility of erroneously identifying the position of the show-through of the document.

On the other hand, if neither side of the document is printed with a photograph, graphic design, or the like, the reversed image generator 215 generates a reversed image by reversing the positions of the pixels in the expanded image left and right with the document transport direction as the axis, and stores the reversed image in the second image memory 202 (step S213).

Figure 14:
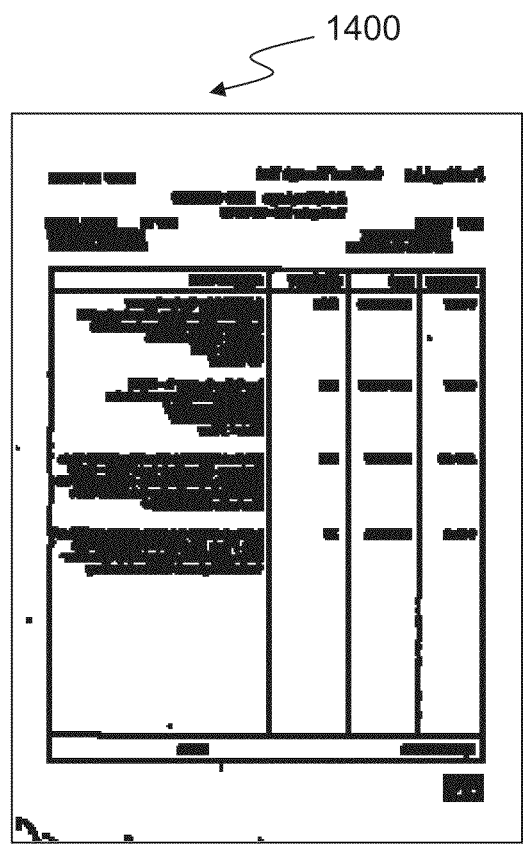
FIG. 14 is a schematic diagram showing an example of a reversed image.

FIG. 14 is a schematic diagram showing an example of the reversed image. The reversed image 1400 shown in FIG. 14 is generated by reversing left and right the positions of the pixels in the expanded image 1100 shown in FIG. 11. As shown in FIG. 14, the pixels in the reversed image 1400 are arranged in the same direction as the corresponding pixels in the second binarized image 910 shown in FIG. 9B.

Next, the show-through position identifying module 216 generates a first processed image by ANDing the expanded pixels in the reversed image on a pixel-by-pixel basis with the pixels located at the corresponding positions on the second binarized image, and stores the first processed image in the second memory 202 (step S214). That is, the first processed image is an image having valid pixels whose positions correspond to the positions of those valid pixels in the second binarized image that are located at the same positions as the respective expanded pixels contained in the reversed image. In other words, the first processed image is an image having valid pixels whose positions correspond to the positions of those valid pixels in the second binarized image that are located at the positions corresponding to the respective expanded pixels contained in the expanded image.

Figure 15:
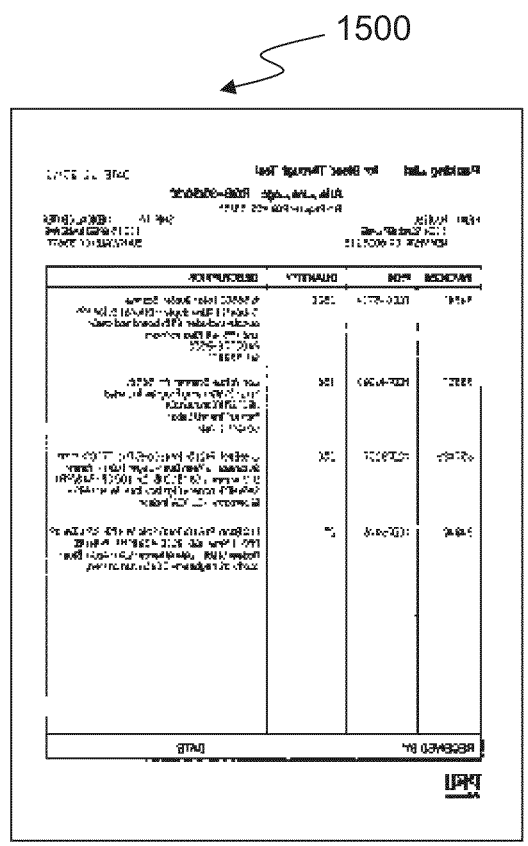
FIG. 15 is a schematic diagram showing an example of a first processed image.

FIG. 15 is a schematic diagram showing an example of the first processed image. The first processed image 1500 shown in FIG. 15 is generated from the second binarized image 910 shown in FIG. 9B and the reversed image 1400 shown in FIG. 14. As shown in FIG. 15, in the first processed image 1500, the valid pixels are taken at positions where the expanded pixels in the reversed image 1400 and the corresponding valid pixels in the second binarized image 900 are both located.

As described above, in the image reading apparatus 100, the first image generator 108*a* for reading the back side of the document and the second image generator 108*b* for reading the front side of the document are disposed one displaced from the other along the document transport direction. The first image generator 108*a* and the second image generator 108*b* read the respective sides of the document when respectively different predetermined times have elapsed after the second document detector 105 has detected the leading edge of the document. As a result, errors can occur in the timing with which the first image generator 108*a* and the second image generator 108*b* respectively read the back side and front side of the document being transported. Consequently, the positions of corresponding pixels on the first and second input images may become displaced in the document transport direction.

Further, the first image generator 108a and the second image generator 108b are located at corresponding positions in the direction orthogonal to the document transport direction. However, the first image generator 108a is located on the body side of the image reading apparatus 100, while the second image generator 108b is located on the top cover side; as a result, when the top cover is opened and closed repeatedly, the position may become displaced in the direction orthogonal to the document transport direction. As a result, the positions of corresponding pixels on the first and second input images may also become displaced in the direction orthogonal to the document transport direction.

Furthermore, the positions of corresponding pixels on the first and second input images may also become displaced due to manufacturing errors in the magnification factors of the optics of the first and second image generators 108a and 108b. If no such positional displacements occur between the first and second input images, a pixel-by-pixel positional displacement can occur when the first and second image generators 108a and 108b respectively resolve the readout documents into pixels with the preset resolution.

Accordingly, even when the valid pixels in the second binarized image are those that occurred due to show-through, there can occur cases where the corresponding pixels in the first binarized image are displaced in position. As a result, if the reversed image of the first binarized image is ANDed with the second binarized image, it may not be possible to correctly extract the pixels that occurred due to the show-through. On the other hand, in the case of the first processed image, since the reversed image of the expanded image generated by expanding the valid pixels in the first binarized image is ANDed with the second binarized image, the pixels that occurred due to the show-through can be extracted more reliably.

If the magnitude of the positional displacement is pronounced in one direction, i.e., either the document transport direction or the direction orthogonal to the document transport direction, the valid pixels may be expanded only in the one direction in the expanded image, as earlier described. Alternatively, the amount of expansion in each direction in the expanded image may be adjusted according to the magnitude of the positional displacement. With these arrangements, the pixels that occurred due to the show-through can be extracted more reliably, while suppressing an increase in the processing load.

Next, the show-through position identifying module 216 generates a second processed image containing expanded pixels obtained by expanding the valid pixels contained in the first processed image, and stores it in the second memory 202 (step S215). The show-through position identifying module 216 generates the second processed image in a similar manner to the expanded image generator 214. The amount of expansion applied to generate the second processing image may be made different from the amount of expansion applied to generate the expanded image.

Figure 16:
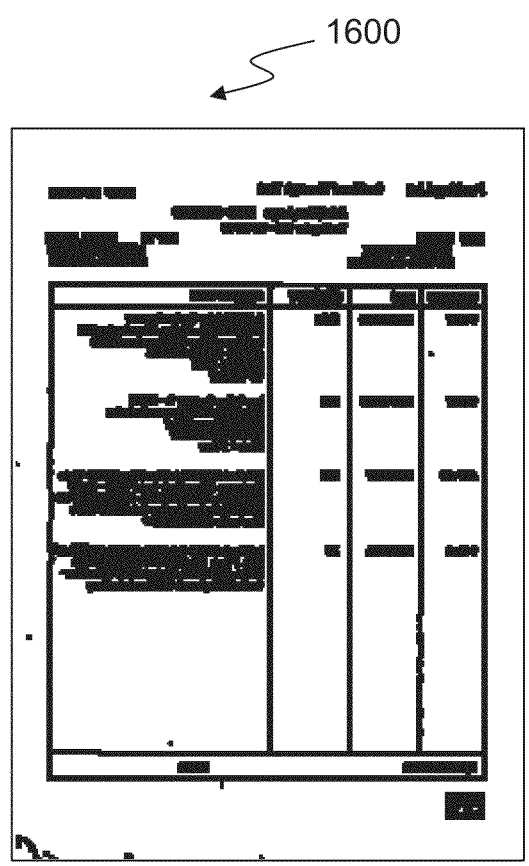
FIG. 16 is a schematic diagram showing an example of a second processed image.

FIG. 16 is a schematic diagram showing an example of the second processed image. The second processed image 1600 shown in FIG. 16 is generated from the first processed image shown in FIG. 15. As shown in FIG. 16, the expanded pixels in the second processed image 1600 are more widely spread than the corresponding valid pixels contained in the first processed image 1500 shown in FIG. 15. If there is any show-through in the second input image, the luminance value of the pixels contained in some portions (in particular, edge portions such as an end of a line segment) of the show-through content may become higher (color becomes lighter). Accordingly, even when the luminance value of the pixels contained in some portions of the show-through content becomes higher, and such pixels are converted into invalid pixels by binarization, the pixels can be extracted in a simple and high accurate manner by generating the second processed image. The tendency for the pixels to be converted into invalid pixels increases as the binarizing threshold value becomes smaller, and decreases as the binarizing threshold value becomes larger. In view of this, the amount of expansion may be adjusted according to the binarizing threshold value in such a manner that the amount of expansion increases as the binarizing threshold value becomes smaller, and decreases as the binarizing threshold value becomes larger. With this arrangement, the pixels that occurred due to the show-through can be extracted with higher accuracy.

Next, the show-through position identifying module 216 identifies the position where the valid pixels are located in the second processed image as being the position of the show-through in the second input image (step S216). The method of identifying the show-through position is not limited to this particular method, the only requirement being that the show-through position identifying module 216 identify the position of the show-through in the second input image, based on the second binarized image and the expanded image. For example, the show-through position identifying module 216 may identify the position where the expanded pixels are located in the first processed image, i.e. the position where the valid pixels in the second binarized image are located that correspond to the respective expanded pixels contained in the expanded image, as being the position of the show-through in the second input image.

Next, the corrected image generator 217 constructs a histogram of the luminance values of the pixels in the second input image (step S217), and obtains from the histogram a representative value corresponding to the luminance value of the background (hereinafter called the background luminance value) in the second input image (step S218).

Figure 17:
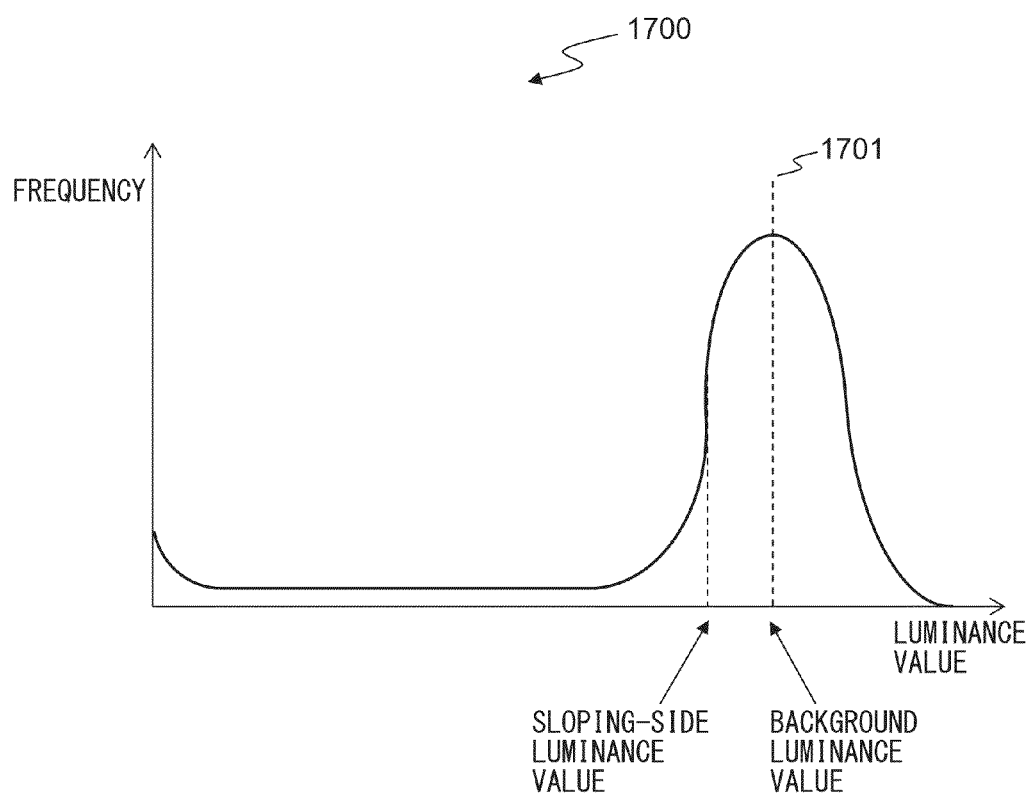
FIG. 17 is a diagram showing an example of a histogram of the luminance values of the pixels in the second input image.

FIG. 17 is a diagram showing one example of the histogram of the luminance values of the pixels in the second input image. In FIG. 17, the luminance value is plotted along the abscissa and the frequency along the ordinate. The corrected image generator 217 searches through the frequency starting from the end at which the luminance value is highest (white color), and the luminance value at which a first peak occurs is taken as the background luminance value.

Next, the corrected image generator 217 generates the corrected image by replacing the value of any pixel in the second input image corresponding to the show-through position by the background luminance value, and stores the corrected image in the second image memory 202 (step S219).

Figure 18:
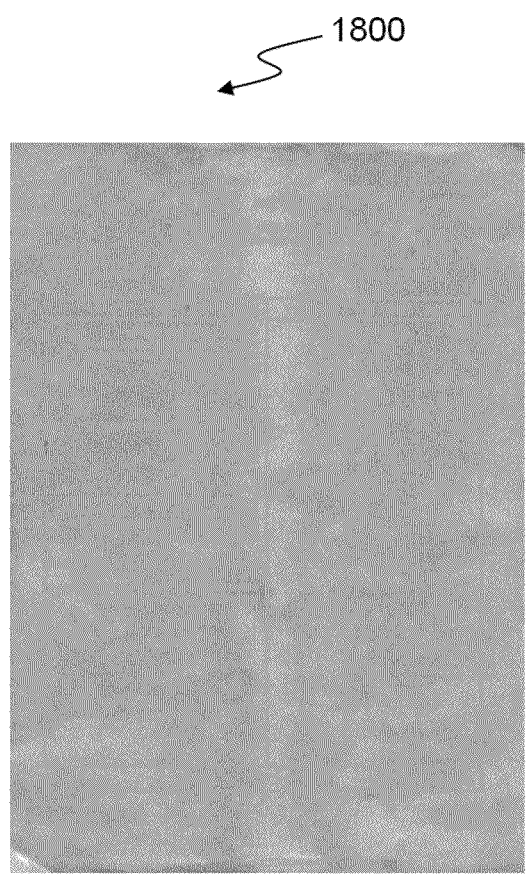
FIG. 18 is a schematic diagram showing an example of a corrected image.

FIG. 18 is a schematic diagram showing an example of the corrected image. The corrected image 1800 shown in FIG. 18 is generated by replacing the value of any pixel corresponding to the show-through position in the second input image 810 of FIG. 8B by its background luminance value. As shown in FIG. 18, the show-through that occurred in the second input image 810 is no longer visible in the corrected image 1800.

Next, the monotone-color determining module 218 determines whether the first input image and the second input image are respectively monotone in color (step S220), and displays the result of the determination on the display 203. The monotone-color determining module 218 determines whether the first input image is monotone in color, based on the first input image itself. On the other hand, when the corrected image is generated for the second input image, the monotone-color determining module 218 determines whether the second input image is monotone in color, based on the corrected image; when the corrected image is not generated, the monotone-color determining module 218 determines whether the second input image is monotone in color, based on the second input image itself. In the following description, the image based on which to determine whether each input image is monotone in color will be referred to as the monotone-color determining image.

The monotone-color determining module 218 generates a binarized monotone-color determining image by binarizing the luminance values in the monotone-color determining image based on a predetermined threshold value. Then, if the ratio of the number of valid pixels to the total number of pixels in the binarized monotone-color determining image thus generated is not lower than a predetermined ratio, the monotone-color determining module 218 determines the corresponding input image is not monotone in color, but if the ratio is lower than the predetermined ratio, the monotone-color determining module 218 determines the corresponding input image is monotone in color.

The monotone-color determining module 218 may generates a compressed image by compressing the binarized monotone-color determining image in accordance with a compression scheme such as run-length compression. In that case, if the compression ratio representing the ratio of the data size of the compressed image to the data size of the binarized monotone-color determining image is not lower than a predetermined ratio, the monotone-color determining module 218 determines the corresponding input image is not monotone in color, but if the ratio is lower than the predetermined ratio, the monotone-color determining module 218 determines the corresponding input image is monotone in color. Likewise, the monotone-color determining module 218 may generates a compressed image by compressing the monotone-color determining image in accordance with a compression scheme such as JPEG (Joint Photographic Experts Group) compression. In that case, if the compression ratio representing the ratio of the data size of the compressed image to the data size of the monotone-color determining image is not lower than a predetermined ratio, the monotone-color determining module 218 determines the corresponding input image is not monotone in color, but if the ratio is lower than the predetermined ratio, the monotone-color determining module 218 determines the corresponding input image is monotone in color. In this way, any document, whether it be an all-black or a light-colored document, can be determined to be monotone in color or not with high accuracy.

Further, the monotone-color determining module 218 may generate edge images by applying edge filtering such as Laplacian filtering or Sobel filtering to the monotone-color determining image. Then, the monotone-color determining module 218 generates a binarized monotone-color determining image by binarizing the pixel values in each edge image using a predetermined threshold value. In this way, it can be determined whether the corresponding input image is monotone in color by determining whether there is a change in luminance value within the image, and any document, whether it be an all-black or a light-colored document, can be determined to be monotone in color or not with high accuracy.

If the first input image or the second input image is determined to be monotone in color, the monotone-color determining module 218 deletes the input image determined to be monotone in color by regarding it as an unwanted image (step S221).

Next, the processing module 219 applies image processing such as cropping and skew correction to the first input image or the second input image, whichever is not deleted, and stores the thus processed image in the second image memory 202 (step S222), after which the series of steps is terminated.

Figure 19A:
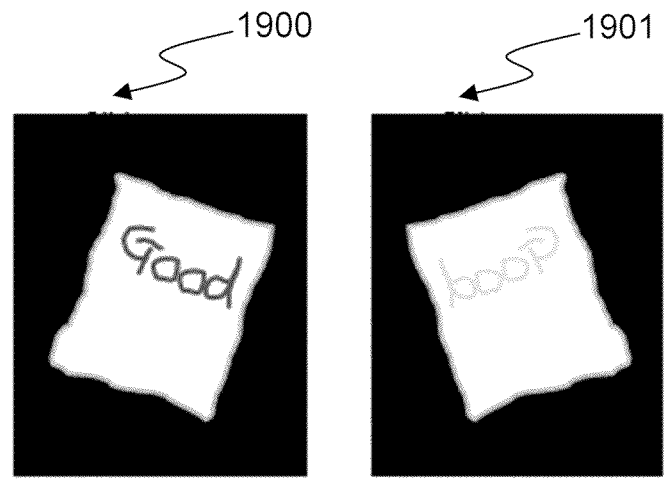
FIG. 19A is a schematic diagram for explaining image processing.
Figure 19B:
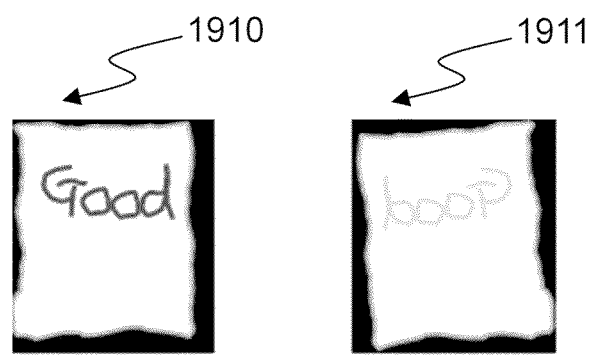
FIG. 19B is a schematic diagram for explaining image processing.

FIGS. 19A and 19B are schematic diagrams for explaining image processing such as cropping and skew correction. The image 1900 shown in FIG. 19A is the first input image generating by reading the front side of a given document, and the image 1901 is the second input image generating by reading the back side of the document. The image 1910 shown in FIG. 19B is a processed image generated by applying cropping and skew correction to the first input image 1900, and the image 1911 is a processed image generated by applying cropping and skew correction to the second input image 1901. The processing module 219 detects document edges on each input image and detects a document region. Then, the processing module 219 corrects any skew by rotating the detected document region, and segments the skew-corrected document region from the image. As a result, if differences occur between the first input image 1900 and the second input image 1901 in the processing such as the document edge detection, document region detection, and document region rotation, corresponding positions in the respective processed images 1910 and 1911 may become displaced relative to each other.

In view of the above, the processing module 219 performs the show-through position identifying process before applying the image processing such as cropping and skew correction. More specifically, the binary image generator 212 generates the first binarized image from the first input image to which the image processing is not yet applied, and generates the second binarized image from the second input image to which the image processing is not yet applied. Consequently, each unit in the image processing circuit 207 performs the show-through position identifying process based on the input images to which the image processing is not yet applied. With this arrangement, the information processing apparatus 200 can identify the position of show-through with high accuracy without being affected by any positional displacement that may occur between the first input image and the second input image because of the image processing. The processing module 219 need only perform one kind of image processing, cropping or skew correction, and the other kind of image processing may be omitted.

The decision steps S204, S209, and S211, and the process from step S217 onward that is performed after identifying the show-through position may also be omitted.

Further, the step S213 for generating the reversed image may be performed before the step S208 for generating the expanded image, and the expanded image generator 214 may generate the expanded image for the reversed image.

Furthermore, the step S213 for generating the reversed image may be omitted, and the show-through position identifying module 216 may generate the first processed image by ANDing the expanded pixels in the expanded image on a pixel-by-pixel basis with the corresponding valid pixels in the second binarized image while converting the coordinates of the respective expanded pixels. This eliminates the need for generating a reversed image and serves to reduce the processing load.

As has been described in detail above, by operating in accordance with the flowchart of FIGS. 6 and 7, the information processing apparatus 200 can reduce the effects of the positional displacements that may occur between the pixels in the input image generated by reading the front side of the document and the corresponding pixels in the input image generated by reading the back side. The information processing apparatus 200 can thus detect accurately the position of show-through in the input image. Generally, the image expansion process requires less processing time and processing load than the image alignment process. It thus becomes possible to detect the position of show-through in a simpler and faster manner than would be possible if the pixels in the input image generated by reading the front side of the document were to be aligned with the corresponding pixels in the input image generated by reading the back side.

Further, by using the corrected image generated by correcting the pixels detected at the position of show-through in the input image, the information processing apparatus 200 can accurately determine whether or not the input image is monotone in color.

Furthermore, if the resolution for reading the document differs, the magnitude of the displacement that occurs between the input image generated by reading the front side of the document and the input image generated by reading the back side also differs. Therefore, by varying the amount of expansion in the expanded image as a function of the resolution, the information processing apparatus 200 can correctly detect the position of show-through in the input image, even when the resolution setting has been changed by the user.

Figure 20:
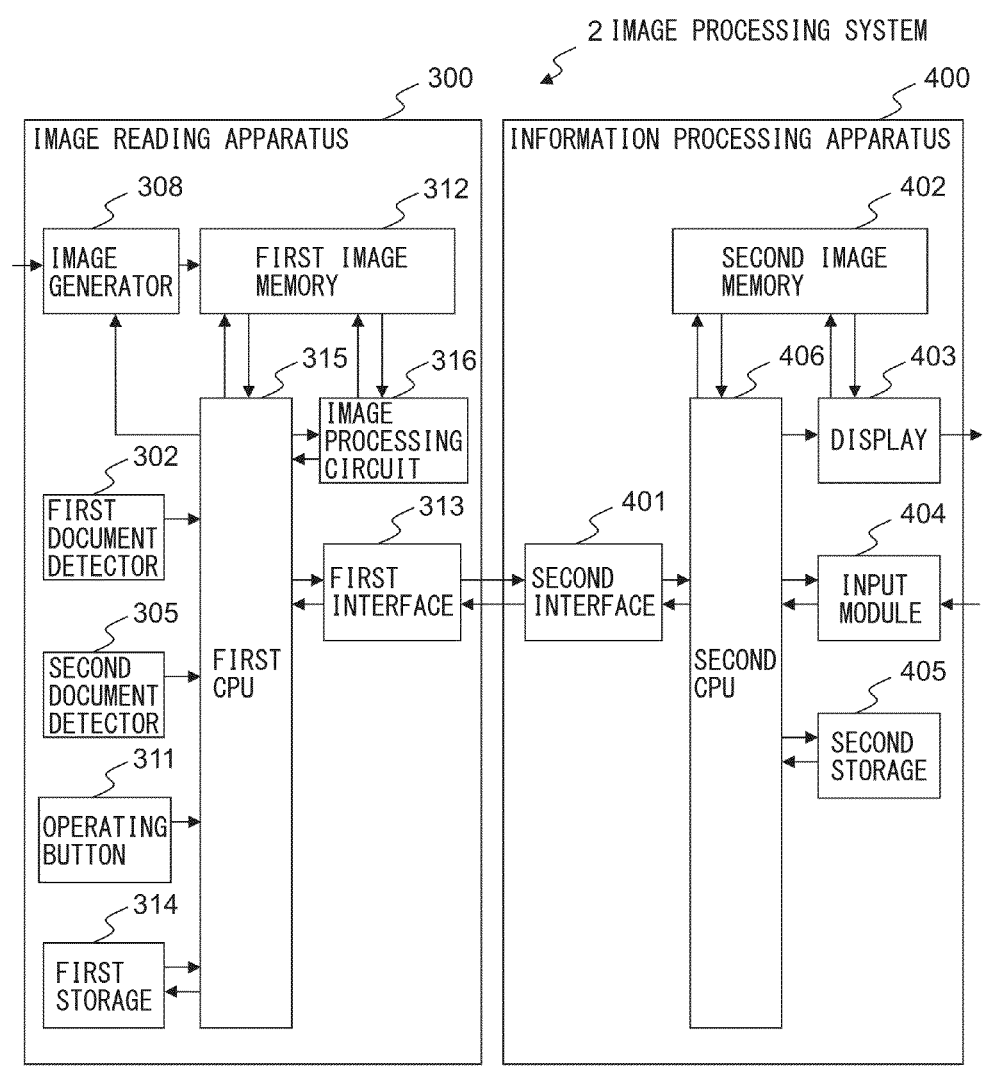
FIG. 20 is a diagram showing schematically the configuration of an alternative image processing system.

FIG. 20 is a diagram showing schematically the configuration of an alternative image processing system 2. The image processing system 2 of FIG. 20 differs from the image processing system 1 of FIG. 3 in that the apparatus equipped with the image processing circuit is different. More specifically, in the image processing system 2, the image reading apparatus 300, not the information processing apparatus 400, is equipped with the image processing circuit 316. The image processing circuit 316 has the same function as the image processing circuit 207 incorporated in the information processing apparatus 200.

The image processing system 2 of FIG. 20 can carry out substantially the same process as that previously described with reference to FIGS. 5 to 7. The following describes how the show-through position identifying process shown in the flowcharts of FIGS. 5 to 7 is applied here. In the information processing system 2, the steps shown in FIGS. 5 to 7 are executed primarily by the first CPU 315 in collaboration with the various component elements of the image reading apparatus 300 in accordance with the program prestored in the first storage 314.

Since the show-through position identifying process is performed in the image reading apparatus 300, the input image transmitting step S111 in FIG. 5 is omitted.

The steps shown in FIGS. 6 and 7 are executed by the image processing circuit 316 incorporated in the image reading apparatus 300. These process steps are executed in the same manner as those executed by the image processing circuit 207 incorporated in the information processing apparatus 200 previously described for the image processing system 1. After checking each input image to determine whether it is monotone in color, the image processing circuit 316 in the image reading apparatus 300 transmits the result of the determination to the information processing apparatus 400 via the first interface 313 together with the image generated by applying image processing to the input image. On the other hand, in step S205, the second CPU 406 in the information processing apparatus 400 performs processing to display the result of the determination on the display 403, while storing the received image in the second image memory 402.

In this way, the same effect as that achieved when the show-through position identifying process is performed in the information processing apparatus equipped with the image processing circuit can also be achieved when the show-through position identifying process is performed in the image reading apparatus 300 equipped with the image processing circuit 316.

While the present invention has been described above with reference to the preferred embodiments thereof, it will be appreciated that the present invention is not limited to the above specific embodiments. For example, the division of functionality between the image reading apparatus and the information processing apparatus is not limited to the example of the image processing system shown in FIG. 3 or 20, but the functional units, including those of the image processing circuit, may be interchanged as desired between the image reading apparatus and the information processing apparatus. Alternatively, the image reading apparatus and the information processing apparatus may be combined into one apparatus.

Further, in the image processing system 1 or 2, the image reading apparatus and the information processing apparatus may be interconnected via a network such as the Internet, a telephone network (including a mobile telephone network or a public switched telephone network), or an intranet. Alternatively, the image reading apparatus and the information processing apparatus may be interconnected via a wireless LAN (Local Area Network). In that case, the first interface and the second interface are each equipped with a communication interface circuit for connection to the network. Furthermore, a plurality of information processing apparatuses may be installed in a distributed manner over the network so that the image processing service can be provided in the form of cloud computing, and the image processing such as document type discrimination and other processing such as image data storage may be performed with the information processing apparatuses collaborating with each other. In this way, the image processing system can efficiently perform the show-through position identifying process on input images generated by a plurality of image reading apparatuses.

According to the image processing apparatus and the image processing method, and the computer-readable, non-transitory medium, the position of show-through in an input image is identified, based on an expanded image generated by expanding the valid pixels contained in the binarized image of the input image generated from one side of a document and on the binarized image of the input image generated from the other side of the document, so it is possible to accurately detect the position of show-through in an input image.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An image processing apparatus comprising:
   an input image acquiring module for acquiring a first input image generated by reading one side of a document and a second input image generated by reading the other side of the document;
   a binarized image generator for generating a first binarized image by binarizing the first input image and a second binarized image by binarizing the second input image;

an expanded image generator for generating an expanded image containing an expanded pixel obtained by expanding a valid pixel contained in the first binarized image; and a show-through position identifying module for identifying a show-through position in the second input image, based on the second binarized image and the expanded image.

2. The image processing apparatus according to claim 1, wherein the show-through position identifying module identifies, as the show-through position, the position of a valid pixel contained in the second binarized image and located at a position corresponding to any one of a plurality of expanded pixels contained in the expanded image in an image.

3. The image processing apparatus according to claim 1, wherein the show-through position identifying module generates a first processed image having a valid pixel, a position of which corresponds to a position of a valid pixel contained in the second binarized image and located at a position corresponding to any one of a plurality of expanded pixels contained in the expanded image, generates a second processed image that contains an expanded pixel obtained by expanding the valid pixel contained in the first processed image, and identifies a position where the valid pixel is located in the second processed image as being the show-through position.

4. The image processing apparatus according to claim 1, further comprising a corrected image generator for generating a corrected image by correcting the pixel corresponding to the show-through position among pixels contained in the second input image.

5. The image processing apparatus according to claim 4, further comprising a monotone-color determining module for determining whether the second input image is monotone in color based on the corrected image.

6. The image processing apparatus according to claim 1, wherein a binarized image having a larger number of valid pixels, of the binarized images generated from the respective sides of the document, is processed as the first binarized image.

7. The image processing apparatus according to claim 1, wherein the show-through position identifying module does not perform processing for identifying the show-through position, when the number of valid pixels contained in the second binarized image is smaller than a first threshold value, or when the ratio of the number of valid pixels to the total number of pixels in the second binarized image is lower than a second threshold value.

8. The image processing apparatus according to claim 1, wherein the show-through position identifying module does not perform processing for identifying the show-through position, when the ratio of the number of expanded pixels contained in the expanded image to the number of valid pixels contained in the first binarized image is lower than a third threshold value.

9. The image processing apparatus according to claim 1, wherein the show-through position identifying module does not perform processing for identifying the show-through position, when the number of valid pixels contained in the first binarized image or the number of valid pixels contained in the second binarized image is larger than a fourth threshold value; or when the ratio of the number of valid pixels to the total number of pixels in the first binarized image or the ratio of the number of valid pixels to the total number of pixels in the second binarized image is higher than a fifth threshold value.

10. The image processing apparatus according to claim 1, further comprising a processing module for applying cropping or skew correction to the first input image and the second input image, and wherein the binarized image generator generates the first binarized image from the first input image to which said cropping or skew correction is not yet applied, and generates the second binarized image from the second input image to which said cropping or skew correction is not yet applied.

11. The image processing apparatus according to claim 1, further comprising a resolution acquiring a module for acquiring a resolution for reading the document, and wherein the resolution acquiring module varies an amount of expansion, by which to expand the valid pixel in the first binarized image, as a function of the resolution.

12. An image processing method comprising:

acquiring a first input image generated by reading one side of a document and a second input image generated by reading the other side of the document;

generating a first binarized image by binarizing the first input image and a second binarized image by binarizing the second input image;

generating an expanded image containing an expanded pixel obtained by expanding a valid pixel contained in the first binarized image; and identifying, using a computer, a show-through position in the second input image, based on the second binarized image and the expanded image.

13. A computer-readable, non-transitory medium storing a computer program, wherein the computer program causes a computer to execute a process, the process comprising:

acquiring a first input image generated by reading one side of a document and a second input image generated by reading the other side of the document;

generating a first binarized image by binarizing the first input image and a second binarized image by binarizing the second input image;

generating an expanded image containing an expanded pixel obtained by expanding a valid pixel contained in the first binarized image; and identifying a show-through position in the second input image, based on the second binarized image and the expanded image.

* * * * *